United States Patent
Yu et al.

(10) Patent No.: US 11,620,815 B2
(45) Date of Patent: Apr. 4, 2023

(54) METHOD AND DEVICE FOR DETECTING AN OBJECT IN AN IMAGE

(71) Applicant: BEIJING BAIDU NETCOM SCIENCE TECHNOLOGY CO., LTD., Beijing (CN)

(72) Inventors: Guanghua Yu, Beijing (CN); Qingqing Dang, Beijing (CN); Haoshuang Wang, Beijing (CN); Guanzhong Wang, Beijing (CN); Xiaoguang Hu, Beijing (CN); Dianhai Yu, Beijing (CN); Yanjun Ma, Beijing (CN); Qiwen Liu, Beijing (CN); Can Wen, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/938,457

(22) Filed: Oct. 6, 2022

(65) Prior Publication Data
US 2023/0031579 A1    Feb. 2, 2023

(30) Foreign Application Priority Data

Oct. 15, 2021    (CN) .......................... 202111202517.5

(51) Int. Cl.
*G06V 10/77*    (2022.01)
*G06V 10/82*    (2022.01)
(Continued)

(52) U.S. Cl.
CPC ........ *G06V 10/7715* (2022.01); *G06V 10/764* (2022.01); *G06V 10/806* (2022.01); *G06V 10/82* (2022.01); *G06V 2201/07* (2022.01)

(58) Field of Classification Search
CPC ...... G06V 10/764; G06V 10/80; G06V 10/82; G06V 10/806; G06V 2201/07
See application file for complete search history.

(56) References Cited

U.S. PATENT DOCUMENTS 10,902,291 B1    1/2021    Kim
2020/0234447 A1*   7/2020    Karmatha .............. G06V 20/58

FOREIGN PATENT DOCUMENTS

CN    108182388 A    6/2018
CN    109359666 A    2/2019
(Continued)

OTHER PUBLICATIONS

CNIPA, First Office Action for CN Application No. 202111202517. 5, dated Feb. 17, 2022.
(Continued)

*Primary Examiner* — Ross Varndell
(74) *Attorney, Agent, or Firm* — Hodgson Russ LLP (57) ABSTRACT

A method for detecting an object in an image includes: obtaining an image to be detected; generating a plurality of feature maps based on the image to be detected by a plurality of feature extracting networks in a neural network model trained for object detection, in which the plurality of feature extracting networks are connected sequentially, and input data of a latter feature extracting network in the plurality of feature extracting networks is based on output data and input data of a previous feature extracting network; and generating an object detection result based on the plurality of feature maps by an object detecting network in the neural network model.

20 Claims, 5 Drawing Sheets

(51) Int. Cl.
*G06V 10/80* (2022.01)
*G06V 10/764* (2022.01)

(56) References Cited

FOREIGN PATENT DOCUMENTS

| CN | 109614985 | A | | 4/2019 |
|---|---|---|---|---|
| CN | 111260630 | A | | 6/2020 |
| CN | 111274942 | A | | 6/2020 |
| CN | 111539942 | A | | 8/2020 |
| CN | 111768365 | A | | 10/2020 |
| CN | 111968087 | A | | 11/2020 |
| CN | 112232232 | A | | 1/2021 |
| CN | 112347936 | A | | 2/2021 |
| CN | 112488060 | A | | 3/2021 |
| CN | 113158913 | A | * | 7/2021 |
| CN | 113158913 | A | | 7/2021 |
| CN | 113269038 | A | | 8/2021 |
| CN | 113298032 | A | | 8/2021 |

OTHER PUBLICATIONS

CNIPA, Notification to Grant Patent Right for Invention for CN Application No. 202111202517.5, dated Apr. 25, 2022.

* cited by examiner

METHOD AND DEVICE FOR DETECTING AN OBJECT IN AN IMAGE

CROSS-REFERENCE TO RELATED APPLICATIONS

This Application claims priority to Chinese Patent Application No. 202111202517.5, filed on Oct. 15, 2021, the entire disclosure of which is incorporated herein by reference.

TECHNICAL FIELD

The present disclosure relates to the field of deep learning, in particular to a method and a device for detecting an object in an image, and a storage medium.

BACKGROUND

Object detection (also known as target detection) technology refers to the technology of searching for an object of interest in an image or video and detecting the corresponding locations and sizes of the object. Object detection is one of the most important and challenging tasks in the field of computer vision, and is applied to fields such as industrial quality inspection, smart transportation, and autonomous driving.

Currently, object detection technology has attracted wide attention as the rise of deep learning technology, meanwhile breakthroughs have been made in application and implementation. For example, object detection algorithms are generally divided into single-stage algorithms and two-stage algorithms. The single-stage object detection algorithms are simple and has fast prediction speed, and are generally deployed on the CPU and mobile edge devices. The two-stage object detection algorithms are more complex and has slow prediction speed, but the accuracy is high, and the algorithms are generally deployed on the GPU server side. In order to achieve high efficiency in real time, the industry continues to propose object detecting models having low parameter quantity and low computing amount, and accelerates the construction of the reasoning library, which makes it convenient for the object detection technology to be deployed and applied.

SUMMARY

According to a first aspect of the present disclosure, a method for detecting an object in an image is provided. The method includes: obtaining an image to be detected; generating a plurality of feature maps based on the image to be detected by a plurality of feature extracting networks in a neural network model trained for object detection, in which the plurality of feature extracting networks are connected sequentially, and input data of a latter feature extracting network in the plurality of feature extracting networks is based on output data and input data of a previous feature extracting network; and generating an object detection result based on the plurality of feature maps by an object detecting network in the neural network model.

According to a second aspect of the present disclosure, an electronic device is provided. The electronic device includes at least one processor and a memory communicatively coupled to the at least one processor. The memory stores instructions executable by the at least one processor, and when the instructions are executed by the at least one processor, the at least one processor is enabled to implement the method according to the first aspect of the present disclosure.

According to a third aspect of the present disclosure, a non-transitory computer-readable storage medium storing computer instructions is provided. The computer instructions are configured to cause a computer to implement the method according to the first aspect of the present disclosure.

It should be understood that the content described in this section is not intended to identify key or important features of the embodiments of the present disclosure, nor is it intended to limit the scope of the present disclosure. Additional features of the present disclosure will be easily understood based on the following description.

BRIEF DESCRIPTION OF THE DRAWINGS

The drawings are used to better understand the solution and do not constitute a limitation to the present disclosure, in which.

DETAILED DESCRIPTION

The following describes the exemplary embodiments of the present disclosure with reference to the accompanying drawings, which includes various details of the embodiments of the present disclosure to facilitate understanding, which shall be considered merely exemplary. Therefore, those of ordinary skill in the art should recognize that various changes and modifications can be made to the embodiments described herein without departing from the scope and spirit of the present disclosure. For clarity and conciseness, descriptions of well-known functions and structures are omitted in the following description.

As mentioned above, although the object detecting model continuously optimizes the computing performance in terms of reasoning and deployment, the computing performance bottleneck cannot be avoided. Therefore, the model design must ensure high efficiency and easy deployment, and ensure that the accuracy of detection meets requirements at the same time. Currently, most models used for detecting an object are only suitable for deployment on the server side, and it is difficult for models suitable for deployment on mobile terminals to achieve real-time performance on commonly used mobile terminal devices, or to achieve high accuracy.

In detail, on the one hand, most of the detection models for traditional mobile terminals are migrated from the server side, and the overall network structure has not changed much. Only the amount of network parameters and the computation amount are compressed to a large extent, resulting in a particularly large drop in the accuracy of the model, thus it is difficult to meet the accuracy requirements in actual deployment and use. On the other hand, it is not particularly applicable to use the traditional scheme of the models on the server side in the design and training of the models on the mobile terminal.

In order to at least partially address one or more of the above problems and other potential problems, the example embodiments of the present disclosure propose a solution for detecting an object in an image. In this solution, the computing device obtains an image to be detected. Subsequently, the computing device generates a plurality of feature maps based on the image to be detected by a plurality of feature extracting networks in a neural network model trained for object detection, in which the plurality of feature extracting networks are connected sequentially, and input data of a latter feature extracting network in the plurality of feature extracting networks is based on output data and input data of a previous feature extracting network. Next, the computing device generates an object detection result based on the plurality of feature maps by an object detecting network in the neural network model. According to the solution of the present disclosure, multi-scale feature fusion can be realized, to enhance the multi-scale feature extraction capability, improving the accuracy of object detection.

Hereinafter, specific embodiments of the present disclosure will be described in detail with reference to the accompanying drawings.

Figure 1:
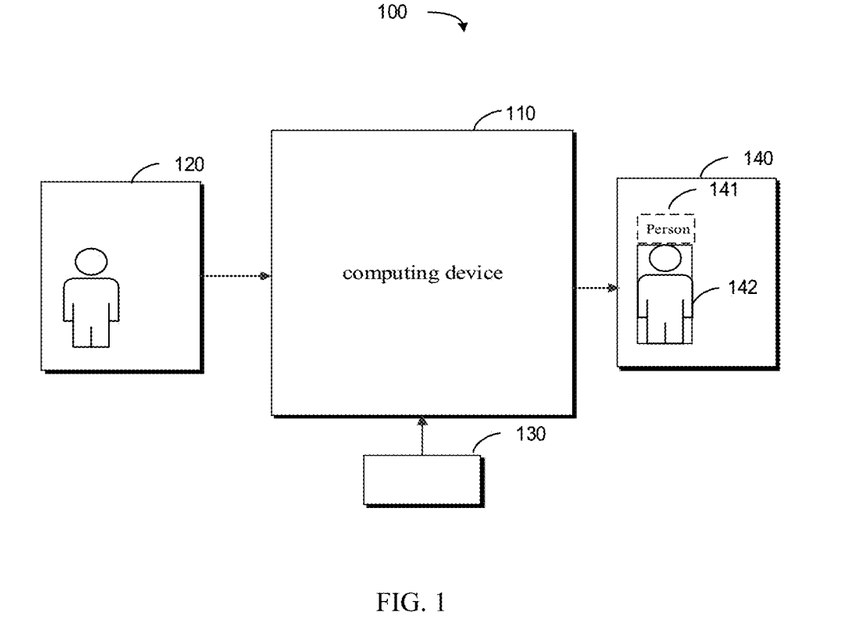
FIG. 1 is a schematic diagram of an information processing environment 100 according to an embodiment of the present disclosure.

FIG. 1 is a schematic diagram of an information processing environment 100 according to an embodiment of the present disclosure. As illustrated in FIG. 1, the information processing environment 100 includes: a computing device 110, an image to be detected 120, a neural network model 130 trained for object detection, and an object detection result 140.

The computing device 110 may include mobile devices such as smartphones, personal digital assistants, tablet computer and wearable devices, in-vehicle electronic devices, and edge computing devices.

The image to be detected 120 may include general images and video frame images. It should be understood that, although FIG. 1 illustratively shows that the object included in the image to be detected 120 is a person as an example, the object included in the image to be detected 120 may also be other types of objects, including but not limited to, animals such as cat, dog and cow, plants such as tree, flower and grasses, items such as bottles and computers, vehicles such as airplanes and cars. The scope of the present disclosure is not limited herein. It should also be understood that, although FIG. 1 illustratively shows that the image to be detected 120 includes one object, the image to be detected 120 may also include multiple objects, and the multiple objects may be of the same type or different types. For example, the image to be detected 120 may include a plurality of persons, or the image to be detected 120 may include persons, animals and plants. The scope of the present disclosure is not limited herein.

The neural network model 130 can be, for example, a lightweight neural network model for detecting an object.

The object detection result 140 may include position box information 142 and type information 141 of the detected object in the image to be detected 120. It should be understood that the position box information 142 (the specific position of the box in FIG. 1) and the type information 141 ("person" in FIG. 1) are for illustration only, and vary according to different positions and types of the detected object in the image to be detected 120. It should also be understood that although FIG. 1 shows that there is only one piece of position box information and type information, which is for illustration only, in the case where multiple objects are stored in the image to be detected 120, there may be multiple pieces of the position box information and type information.

The computing device 110 is configured to obtain the image to be detected 120. The plurality of feature maps are generated based on the image to be detected 120 by the plurality of feature extracting networks in the neural network model 130 trained for object detection. The plurality of feature extracting networks are connected sequentially, and input data of a latter feature extracting network in the plurality of feature extracting networks is based on output data and input data of a previous feature extracting network. The object detection result 140 is generated based on the plurality of feature maps by an object detecting network in the neural network model 130.

In this way, multi-scale feature fusion can be realized, to enhance the multi-scale feature extraction capability, improving the accuracy of object detection.

Figure 2:
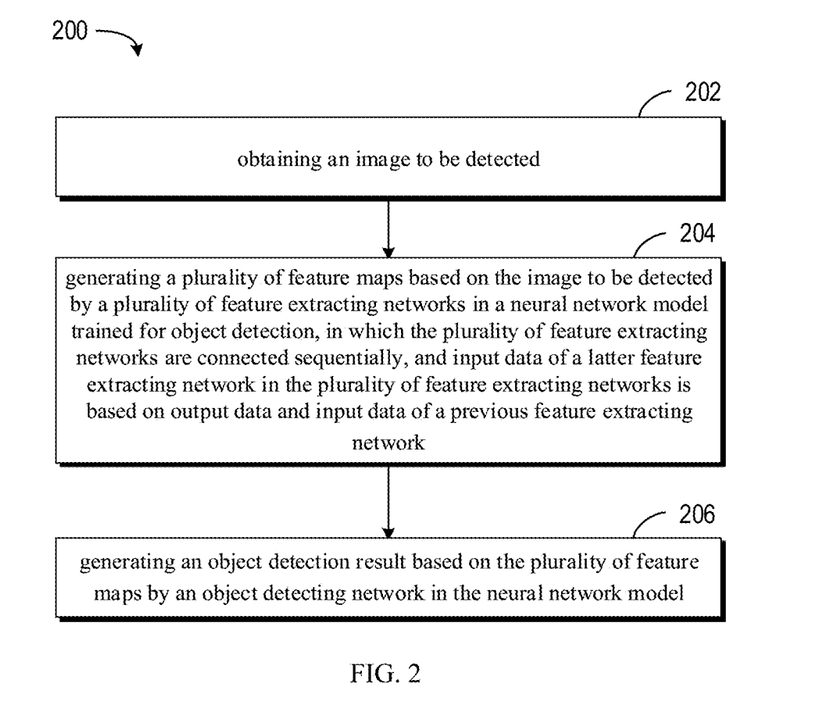
FIG. 2 is a schematic diagram of a method 200 for detecting an object in an image according to an embodiment of the present disclosure.

FIG. 2 is a schematic diagram of a method 200 for detecting an object in an image according to an embodiment of the present disclosure. For example, the method 200 may be executed by the computing device 110 as shown in FIG. 1. It should be understood that the method 200 may also include additional boxes that are not shown and/or shown frames that can be omitted, and the scope of the present disclosure is not limited in this regard.

At block 202, the computing device 110 obtains the image to be detected 120.

At block 204, the computing device 110 generates the plurality of feature maps based on the image to be detected 120 by the plurality of feature extracting networks in the neural network model 130 trained for object detection. The plurality of feature extracting networks are connected sequentially, and input data of a latter feature extracting network in the plurality of feature extracting networks is based on output data and input data of a previous feature extracting network.

The feature extracting network can include multiple residual blocks for downsampling and feature extraction.

The plurality of feature maps may have different sizes. The size of the feature map output by the latter feature extracting network may be smaller than the size of the feature map output by the previous feature extracting network. For example, the size of the feature map output by the latter feature extracting network may be ½ of the size of the feature map output by the previous feature extracting network.

At block 206, the computing device 110 generates the object detection result 140 by the object detecting network in the neural network model 130 based on the plurality of feature maps.

Therefore, the input data of the latter feature extracting network is based on the output data and input data of the previous feature extracting network, there is a skip connection between the input data of the previous feature extracting network and the input data of the latter feature extracting network. In this way, multi-scale feature fusion can be realized, to enhance the multi-scale feature extraction capability, improving the accuracy of object detection.

In some embodiments, the computing device 110 may generate a fused feature map by a feature pyramid network in the neural network model 130 based on the plurality of feature maps. The computing device 110 may then generate the object detection result 140 by the object detecting network based on the fused feature map. There may be one or more fused feature map. Correspondingly, there may be one or more object detecting networks and object detection results.

Therefore, multiple feature maps are fused through the feature pyramid network to generate the fused feature map for object detection, which can further enhance multi-scale feature fusion, improving the accuracy of object detection, especially suitable for detecting an object for mobile devices and edge computing devices.

Figure 3:
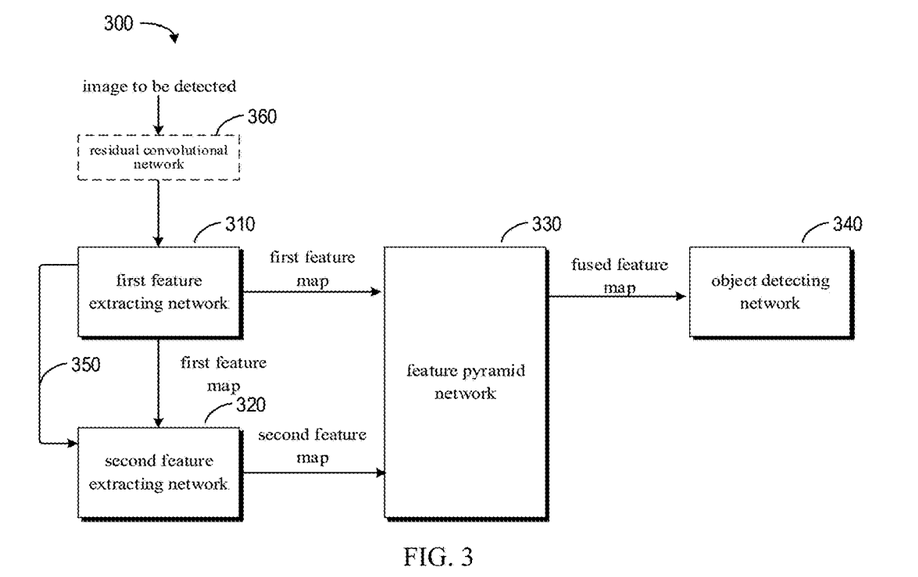
FIG. 3 is a schematic diagram of a neural network model 300 according to an embodiment of the present disclosure.

FIG. 3 is a schematic diagram of a neural network model 300 according to an embodiment of the present disclosure. As illustrated in FIG. 3, the neural network model 300 includes a first feature extracting network 310, a second feature extracting network 320, a feature pyramid network 330 and an object detecting network 340. There is a skip connection 350 between the first feature extracting network 310 and the second feature extracting network 320. The skip connection 350 allows the input data of the second feature extracting network 320 to be based on the input data and output data of the first feature extracting network 310.

It should be understood that, although FIG. 3 illustratively shows two feature extracting networks connected in sequence, the neural network model 300 may also include more feature extracting networks, for example, the neural network model 300 may also include a third feature extracting network. There is a skip connection between the third feature extracting network and the second feature extracting network 320, which allows the input data of the third feature extracting network to be based on the input data and output data of the second feature extracting network 320.

It should be understood that, although FIG. 3 illustratively shows that the feature pyramid network 330 outputs one fused feature map, the feature pyramid network 330 may also output multiple fused feature maps. The multiple fused feature maps can have different sizes. The number and size of the fused feature maps may match the number and size of feature maps received by the feature pyramid network 330, e.g., 2 fused feature maps with different sizes, or 3 fused feature maps with different sizes.

It should also be understood that, although FIG. 3 illustratively shows one object detecting network, the neural network model 300 may include multiple object detecting networks, and the number of object detecting networks may be related to the number of the generated fused feature maps, e.g., 2 object detecting networks, or 3 object detecting networks.

In some embodiments, the computing device 110 may generate a first feature map by the first feature extracting network 310 based on the image to be detected 120. Subsequently, the computing device 110 may generate a second feature map by the second feature extracting network 320 based on the image to be detected 120 and the first feature map.

In detail, the computing device 110 may downsample the image to be detected 120, to generate a downsampled image to be detected. The size of downsampled image to be detected is the same as that of the first feature map, for example, ½ downsampling. Next, the computing device 110 may generate first input data of the second feature extracting network 320 based on the downsampled image to be detected and the first feature map. For example, the downsampled image to be detected and the first feature map are added pixel by pixel, to generate the first input data for the second feature extracting network 320. Then, the computing device 110 may generate the second feature map by the second feature extracting network 320 based on the first input data of the second feature extracting network 320.

Thus, the input data of the second feature extracting network is based on the output data and the input data of the first feature extracting network, there is the skip connection between the second feature extracting network and the first feature extracting network, to realize multi-scale feature fusion. Since the second feature map is a feature map output by multi-scale feature fusion, the multi-scale feature extraction capability is enhanced, improving the accuracy of object detection.

In the case where the neural network model 300 also includes the third feature extracting network, the computing device 110 can also generate a third feature map by the third feature extracting network based on the image to be detected 120, the first feature map and the second feature map.

In detail, the computing device 110 may downsample the first input data of the second feature extracting network 320, to generate the downsampled first input data. The size of downsampled first input data is the same as that of the second feature map, for example, ½ downsampling. Next, the computing device 110 may generate second input data for the third feature extracting network based on the downsampled first input data and the second feature map. For example, the downsampled first input data and the second feature map are added pixel by pixel, to generate second input data for the third feature extracting network. Then, the computing device 110 may generate the third feature map by the third feature extracting network based on the second input data of the third feature extracting network.

Figure 4:
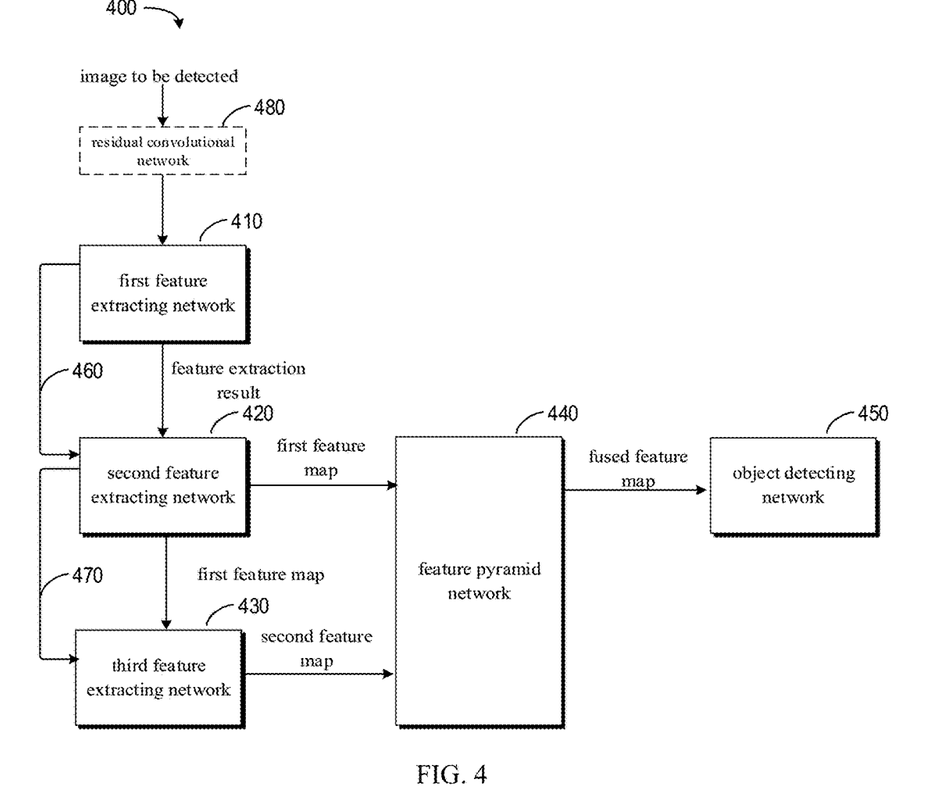
FIG. 4 is a schematic diagram of a neural network model 400 according to an embodiment of the present disclosure.

FIG. 4 is a block diagram of a neural network model 400 according to an embodiment of the present disclosure. As illustrated in FIG. 4, the neural network model 400 includes a first feature extracting network 410, a second feature extracting network 420, a third feature extracting network 430, a feature pyramid network 440 and an object detecting network 450. There is a skip connection 460 between the first feature extracting network 410 and the second feature extracting network 420. The skip connection 460 allows the input data of the second feature extracting network 420 to be based on the input data and output data of the first feature extracting network 410. There is a skip connection 470 between the third feature extracting network 430 and the second feature extracting network 420. The skip connection 470 allows the input data of the third feature extracting network 430 to be based on the input data and output data of the second feature extracting network 420.

It should be understood that, although FIG. 4 illustratively shows three feature extracting networks connected in sequence, the neural network model 400 may also include more feature extracting networks, for example, the neural network model 400 may also include a fourth feature extracting network, and there is a skip connection between the fourth feature extracting network and the third feature extracting network 430, which allows input data of the fourth feature extracting network to be based on the input data and output data of the third feature extracting network 430.

It should be understood that, although FIG. 4 illustratively shows that the feature pyramid network 440 outputs one fused feature map, the feature pyramid network 440 may also output multiple fused feature maps of different sizes. The number and size of the fused feature maps may match the number and size of the feature maps received by the feature pyramid network 440, e.g., 2 fused feature maps of different sizes, or 3 fused feature maps of different sizes.

It should also be understood that, although FIG. 4 illustratively shows one object detecting network, the neural network model 400 may include multiple object detecting networks, and the number of object detecting networks matches the number of generated fused feature maps, e.g., 2 object detecting networks, or 3 object detecting networks.

In some embodiments, the computing device 110 may generate a feature extraction result by the first feature extracting network 410 based on the image to be detected 120. Subsequently, the computing device 110 may generate the first feature map by the second feature extracting network 420 based on the image to be detected 120 and the feature extraction result. Next, the computing device 110 may generate the second feature map by the third feature extracting network 430 based on the image to be detected 120, the feature extraction result and the first feature map. The process of generating the first feature map and the second feature map is similar to the above, and will not be described again.

Thus, the input data of the third feature extracting network is based on the output data and input data of the second feature extracting network, the input data of the second feature extracting network is based on the output data and input data of the first feature extracting network. The skip connection between the third feature extracting network and the second feature extracting network, and the skip connection between the second feature extracting network and the first feature extracting network are adopted to realize multi-scale feature fusion. Since the first feature map and the second feature map are both feature maps output through the multi-scale feature fusion, the multi-scale feature extraction capability is enhanced, improving the accuracy of object detection.

Alternatively, or additionally, in some embodiments, the neural network model 300 may further include a residual convolutional network 360, and the neural network model 400 may further include a residual convolutional network 480.

The computing device 110 may generate a residual convolution result based on the image to be detected 120 by a residual convolutional network. Subsequently, the computing device 110 may generate a plurality of feature maps by the plurality of feature extracting networks based on the residual convolution result.

It should be understood that, in the case where the neural network model 300 and the neural network model 400 both include the residual convolutional network, the above process of generating the feature map or the feature extraction result can be adapted and modified based on the residual convolution result, and details will not be repeated.

Therefore, compared with the problem that downsampling speed of the image to be detected through max pooling is too fast in the traditional scheme, the downsampling of the image to be detected by the residual convolutional network avoids the loss of accuracy caused by insufficient sampling of local features.

Figure 5:
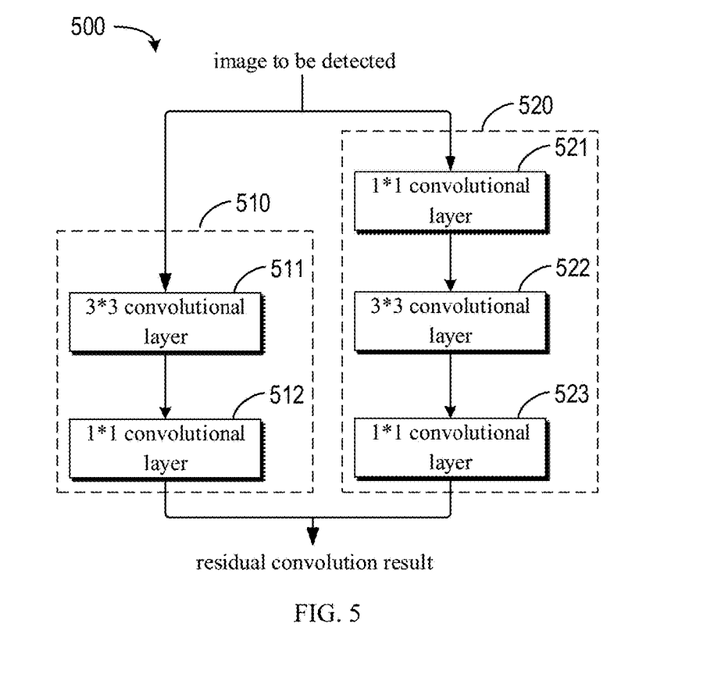
FIG. 5 is a schematic diagram of a residual convolutional network 500 according to an embodiment of the present disclosure.

FIG. 5 is a block diagram of a residual convolutional network 500 according to an embodiment of the present disclosure. As illustrated in FIG. 5, the residual convolutional network 500 includes two branches 510 and 520. The first branch 510 includes a 3*3 convolutional layer 511 and a 1*1 convolutional layer 512. The second branch 520 includes a 1*1 convolutional layer 521, a 3*3 convolutional layer 522 and a 1*1 convolutional layer 523.

The computing device 110 may generate a first branch convolution result, by the first branch 510 including a 3*3 convolutional layer and a 1*1 convolutional layer, based on the image to be detected 120. The computing device 110 may also generate a second branch convolution result, by the second branch 520 including a 1*1 convolutional layer, a 3*3 convolutional layer, and a 1*1 convolutional layer, based on the image to be detected 120. Subsequently, the computing device 110 may generate the residual convolution result based on the first branch convolution result and the second branch convolution result.

Thus, through the first branch including a 3*3 convolutional layer and a 1*1 convolutional layer and the second branch including 1*1 convolutional layer, 3*3 convolutional layer and 1*1 convolutional layer, the residual convolutional network is relatively lightweight and improves efficiency.

Figure 6:
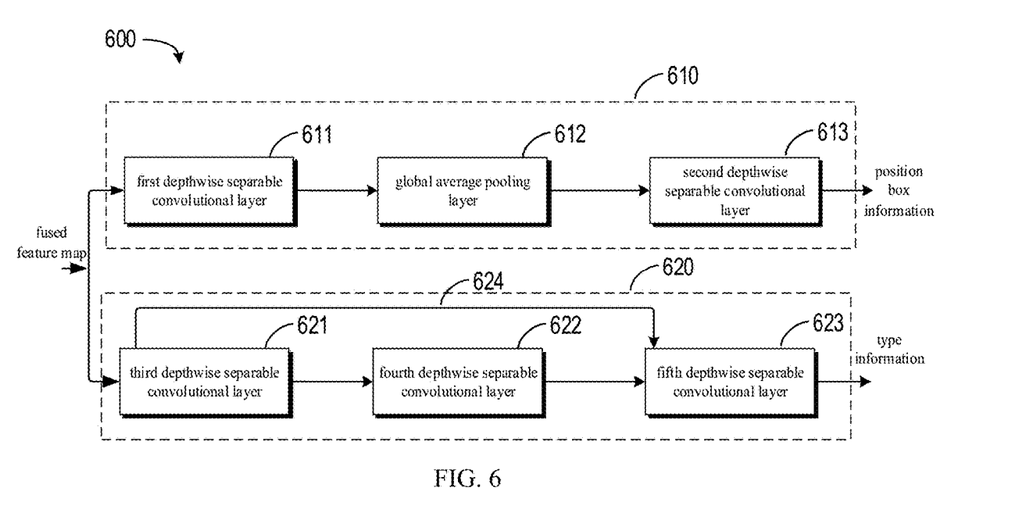
FIG. 6 is a schematic diagram of an object detecting network 600 according to an embodiment of the present disclosure.

FIG. 6 is a block diagram of an object detecting network 600 according to an embodiment of the present disclosure. As illustrated in FIG. 6, the object detecting network 600 includes a position box detecting branch 610 and an object classifying branch 620.

The position box detecting branch 610 includes a first depthwise separable convolutional layer 611, a global average pooling layer 612, and a second depthwise separable convolutional layer 613.

The object classifying branch 620 includes a third depthwise separable convolutional layer 621, a fourth depthwise separable convolutional layer 622, and a fifth depthwise separable convolutional layer 623. There is a skip connection 624 between the fifth depthwise separable convolutional layer 623 and the third depthwise separable convolutional layer 621, allowing input data of the fifth depthwise separable convolutional layer 623 to be based on the input data and output data of the third depthwise separable convolutional layer 621.

Thus, by the depthwise separable convolutional layers, the object detecting network 600 only carries a small amount of parameters, which ensures the high efficiency of object detection.

Figure 7:
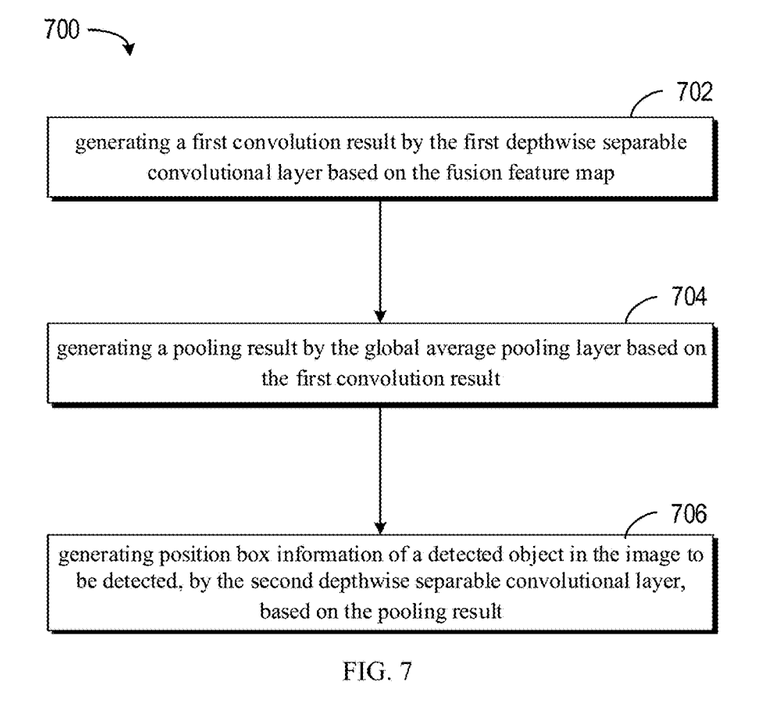
FIG. 7 is a schematic diagram of a method 700 for generating an object detection result according to an embodiment of the present disclosure.

FIG. 7 is a flowchart of a method 700 for generating an object detection result according to an embodiment of the present disclosure. For example, the method 700 may be executed by the computing device 110 as shown in FIG. 1. It should be understood that the method 700 may also include additional boxes that are not shown and/or shown frames that can be omitted, and the scope of the present disclosure is not limited in this regard.

At block 702, the computing device 110 generates a first convolution result by the first depthwise separable convolutional layer 611 based on the fused feature map.

At block 704, the computing device 110 generates a pooling result by the global average pooling layer 612 based on the first convolution result.

At block 706, the computing device 110 generates, by the second depthwise separable convolutional layer 613, position box information for a detected object in the image to be detected 120 based on the pooling result.

Thus, the global average pooling layer having an attention mechanism is adopted between two depthwise separable convolutional layers, so that the object features can be more significant and the detection accuracy is improved. In addition, the depthwise separable convolutional layers carry only a small amount of parameters, which ensures the high efficiency of object detection.

The size of a convolution kernel in the first depthwise separable convolutional layer and the size of a convolution kernel in the second depthwise separable convolutional layer can be configured as 5*5. As a result, compared to the 3*3 convolution kernel, the speed of object detection does not decrease, but the accuracy is higher.

Figure 8:
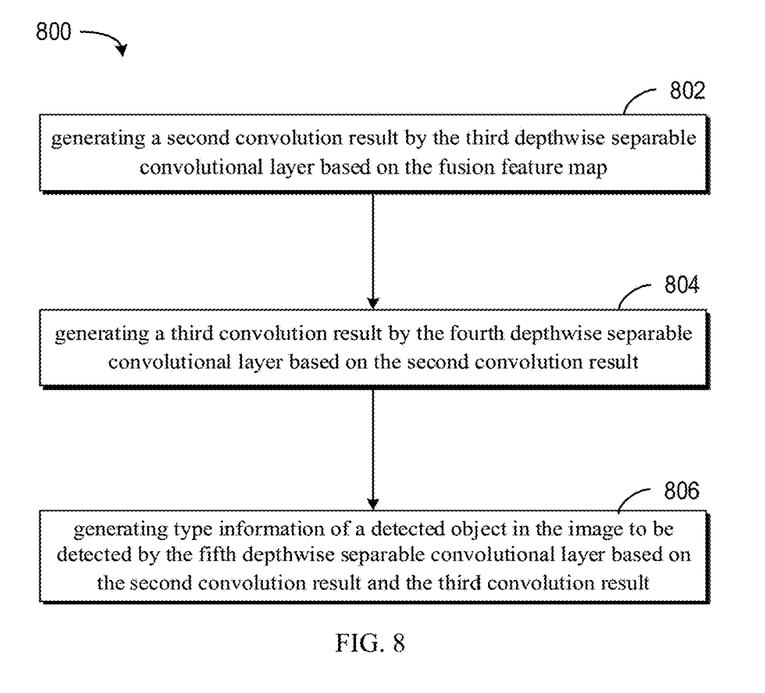
FIG. 8 is a schematic diagram of a method 800 for generating an object detection result according to an embodiment of the present disclosure.

FIG. 8 is a flowchart of a method 800 for generating an object detection result according to an embodiment of the present disclosure. For example, the method 800 may be executed by the computing device 110 as shown in FIG. 1. It should be understood that the method 800 may also include additional boxes that are not shown and/or shown frames that can be omitted, and the scope of the present disclosure is not limited in this regard.

At block 802, the computing device 110 generates a second convolution result by the third depthwise separable convolutional layer 621 based on the fused feature map.

At block 804, the computing device 110 generates a third convolution result by the fourth depthwise separable convolutional layer 622 based on the second convolution result.

At block 806, the computing device 110 generates, by the fifth depthwise separable convolutional layer 623, type information for the detected object in the image to be detected 120 based on the second convolution result and the third convolution result.

Therefore, the input data of the fifth depthwise separable convolutional layer is based on the output data and input data of the previous third depthwise separable convolutional layer, it is equivalent to realizing the skip connection. The regularization is improved without increasing the parameters, to improve the generalization ability and prevent overfitting. In addition, the depthwise separable convolutional layers carry only a small amount of parameters, which ensures the high efficiency of object detection.

The sizes of the convolution kernel in the third depthwise separable convolutional layer, the fourth depthwise separable convolutional layer, and the fifth depthwise separable convolutional layer may be configured as 5*5. As a result, compared to the 3*3 convolution kernel, the speed of object detection does not decrease, but the accuracy is higher.

The solution of the present disclosure can reduce the time-consuming of the object detecting model on edge devices such as mobile terminals, and the parameter quantity of the entire model is only 1M, for example, it is predicted as reaching 130 FPS on the Kirin 980 chip. Meanwhile, the solution of the present disclosure also ensures the accuracy of object detection. Compared with the object detecting model of YOLOv3-Mobilenetv3, the model parameter quantity is compressed by 25 times, and the prediction speed is increased by 51 times.

Exponential Moving Average (hereinafter collectively referred to as EMA) refers to a calculation of an average of the parameters of the neural network model in the adjacent training rounds during the training process, to achieve stability and improve the effect of convergence speed. The inventors found that using EMA in the whole process of model training on the server side can speed up the convergence and improve the accuracy, but using EMA in the whole process of model training such as on the mobile terminals will not bring the benefit of improving the accuracy. After analysis, the inventors found that model training of mobile terminals requires more epochs, basically as long as several hundred epochs, and the continuous accumulation of EMA parameters will cause the training to fall into a local optimum. In order to solve this problem, the present disclosure proposes that the neural network model can be generated through multiple rounds of training according to the EMA algorithm, in which the parameters of the EMA algorithm are reset every preset number of training rounds, which is equivalent to restarting the EMA algorithm, which can cause regularization effect and improve the accuracy. On models such as mobile terminals, the average accuracy can generally be improved by more than 1%.

In addition, the inventors also found that different from the neural network model on the server side, the object detecting models such as mobile terminals have a small parameter quantity, and the network convergence speed is slow. If the gradient fixed-round decay learning rate strategy of the neural network models on the server side is adopted, the convergence speed of the models on the server side is slow. Meanwhile, the training of lightweight models on the mobile terminal requires more batch data, and the learning rate can be appropriately adjusted. Therefore, the present disclosure proposes that the neural network model can be generated through multiple rounds of training, and cosine decay is performed on the learning rate of the next round of training in the multiple rounds of training based on the learning rate of the previous round of training. For example, the learning rate of the next round of training=0.4 cos (the learning rate of the previous round of training), where 0.4 is the initial value, and it should be understood that, for the initial value, this value is an example, and other values may also be used. In this way, the convergence speed of the model can be accelerated, and the accuracy of the model can be improved at the same time.

In addition, the inventors also found that, the parameter stochastic gradient descent method is used in the training process of the neural network model, the momentum (gradient descent with momentum) will be set with regularity to prevent overfitting of the training. The larger parameter quantity of the models on the server side, the higher the decay rate of the regularity, generally $10^3$. However, small model has small parameter quantity, and high decay rate will cause the model to converge and oscillate, and further affect the accuracy. To this end, the present disclosure proposes that the neural network model can be generated by training according to the gradient descent with momentum algorithm, the regular decay rate of the gradient descent with momentum algorithm may be configured as 4e-5. Therefore, the accuracy of the model can be improved.

Figure 9:
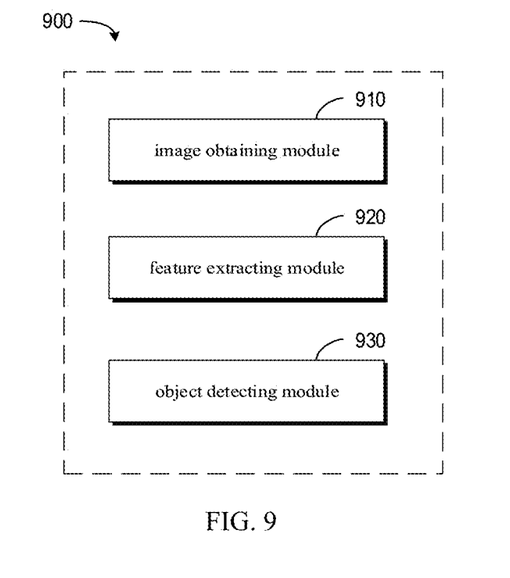
FIG. 9 is a schematic diagram of an apparatus 900 for detecting an object in an image according to an embodiment of the present disclosure.

FIG. 9 is a block diagram of an apparatus 900 for detecting an object in an image according to an embodiment of the present disclosure. As illustrated in FIG. 9, the apparatus 900 includes an image obtaining module 910, a feature extracting module 920 and an object detecting module 930.

The image obtaining module 910 is configured to obtain the image to be detected 120.

The feature extracting module 920 is configured to generate the plurality of feature maps based on the image to be detected 120 by the plurality of feature extracting networks in the neural network model 130 trained for object detection. The plurality of feature extracting networks are connected sequentially, and input data of a latter feature extracting network in the plurality of feature extracting networks is based on output data and input data of a previous feature extracting network.

The object detecting module 930 is configured to generate an object detection result based on the plurality of feature maps by an object detecting network in the neural network model 130.

Therefore, the input data of the latter feature extracting network is based on the output data and input data of the previous feature extracting network, there is a skip connection between the input data of the previous feature extracting network and the input data of the latter feature extracting network, to achieve the multi-scale feature fusion and enhance multi-scale feature extraction capability, improving the accuracy of object detection, and especially suitable for the object detection of mobile devices and edge computing devices.

In some embodiments, the feature extracting module 920 may include: a first feature map generating sub-module, configured to generate a first feature map by a first feature extracting network based on the image to be detected 120; and a second feature map generating sub-module, configured to generate a second feature map by a second feature extracting network based on the image to be detected and the first feature map.

In some other embodiments, the feature extracting module 920 may include: a feature extraction result generating sub-module, a first feature map generating sub-module and a second feature map generating sub-module. The feature extraction result generating sub-module is configured to generate a feature extraction result by a first feature extracting network based on the image to be detected 120. The first feature map generating sub-module is configured to generate a first feature map by a second feature extracting network based on the image to be detected 120 and the feature extraction result. The second feature map generating sub-module is configured to generate a second feature map by a third feature extracting network based on the image to be detected 120, the feature extraction result and the first feature map.

Alternatively, or additionally, in some embodiments, the feature extracting module 920 may include a residual convolutional sub-module and a feature extracting sub-module. The residual convolutional sub-module is configured to generate a residual convolution result by a residual convolutional network based on the image to be detected 120. The feature extracting sub-module is configured to generate the plurality of feature maps by the plurality of feature extracting networks based on the residual convolution result.

In some embodiments, the residual convolutional sub-module can also be configured to:
generate a first branch convolution result, by a first branch including a 3*3 convolution layer and a 1*1 convolution layer, based on the image to be detected 120;
generate a second branch convolution result, by a second branch including a 1*1 convolutional layer, a 3*3 convolutional layer and a 1*1 convolutional layer, based on the image to be detected 120; and
generate the residual convolution result based on the first branch convolution result and the second branch convolution result.

In some embodiments, the object detecting module 930 may include a feature fusing sub-module and an object detecting sub-module. The feature fusing sub-module is configured to generate a fused feature map by a feature pyramid network in the neural network model 130 based on the plurality of feature maps. The object detecting sub-module is configured to generate the object detection result by the object detecting network based on the fused feature map.

In some embodiments, the object detecting sub-module is further configured to:
generate a first convolution result by the first depthwise separable convolutional layer based on the fused feature map;
generate a pooling result by the global average pooling layer based on the first convolution result; and
generate position box information of a detected object in the image to be detected 120, by the second depthwise separable convolutional layer, based on the pooling result.

In some embodiments, the size of a convolution kernel of the first depthwise separable convolutional layer and the size of a convolution kernel of the second depthwise separable convolutional layer are configured as 5*5.

In some embodiments, the object detecting sub-module is further configured to:
generate a second convolution result by a third depthwise separable convolutional layer based on the fused feature map;
generate a third convolution result by a fourth depthwise separable convolutional layer based on the second convolution result; and
generate type information of a detected object in the image to be detected by a fifth depthwise separable convolutional layer based on the second convolution result and the third convolution result.

In some embodiments, the neural network model 130 is generated through multiple rounds of training based on an exponential moving average algorithm, and parameters of the exponential moving average algorithm are reset every preset number of training rounds.

In some embodiments, the neural network model 130 is generated through multiple rounds of training, and cosine decay is performed on a learning rate of a round of training in the multiple rounds of training based on a learning rate of a previous round of training.

In some embodiments, the neural network model 130 is generated by training with a gradient descent with momentum algorithm, and a regularization decay rate of the gradient descent with momentum algorithm is configured to be 4e-5.

In the technical solution of the present disclosure, the acquisition, storage and application of the user's personal information involved all comply with the provisions of relevant laws and regulations, and do not violate public order and good customs.

According to the embodiments of the present disclosure, the present disclosure provides an electronic device, a readable storage medium and a computer program product.

Figure 10:
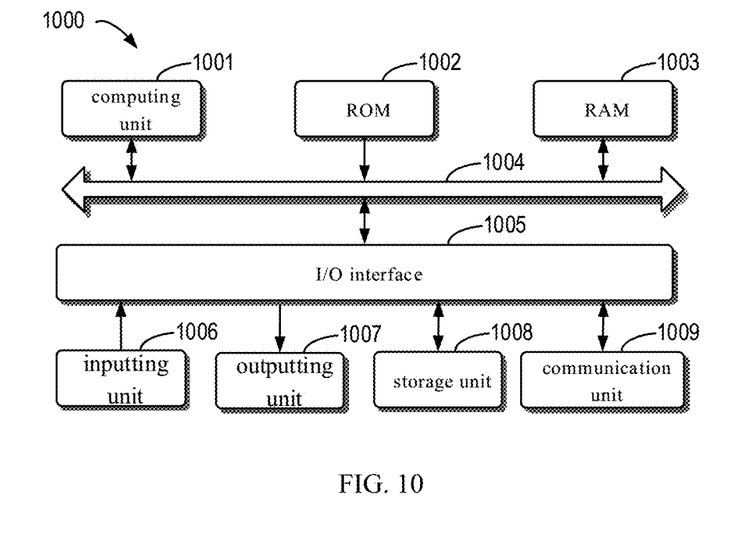
FIG. 10 is a block diagram of an electronic device 1000 for implementing the method for detecting an object in an image according to an embodiment of the present disclosure.

FIG. 10 is a block diagram of an example electronic device 1000 used to implement the embodiments of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the present disclosure described and/or required herein.

As illustrated in FIG. 10, the electronic device 1000 includes: a computing unit 1001 performing various appropriate actions and processes based on computer programs stored in a read-only memory (ROM) 1002 or computer programs loaded from the storage unit 1008 to a random access memory (RAM) 1003. In the RAM 1003, various programs and data required for the operation of the device 1000 are stored. The computing unit 1001, the ROM 1002, and the RAM 1003 are connected to each other through a bus 1004. An input/output (I/O) interface 1005 is also connected to the bus 1004.

Components in the device 1000 are connected to the I/O interface 1005, including: an inputting unit 1006, such as a keyboard, a mouse; an outputting unit 1007, such as various types of displays, speakers; a storage unit 1008, such as a disk, an optical disk; and a communication unit 1009, such as network cards, modems, and wireless communication transceivers. The communication unit 1009 allows the device 1000 to exchange information/data with other devices through a computer network such as the Internet and/or various telecommunication networks.

The computing unit 1001 may be various general-purpose and/or dedicated processing components with processing and computing capabilities. Some examples of computing unit 1001 include, but are not limited to, a central processing unit (CPU), a graphics processing unit (GPU), various dedicated AI computing chips, various computing units that run machine learning model algorithms, and a digital signal processor (DSP), and any appropriate processor, controller and microcontroller. The computing unit 1001 executes the various methods and processes described above, such as the method 200, method 700 and method 800. For example, in some embodiments, the method 200, method 700 and method 800 may be implemented as a computer software program, which is tangibly contained in a machine-readable medium, such as the storage unit 1008. In some embodiments, part or all of the computer program may be loaded and/or installed on the device 1000 via the ROM 1002 and/or the communication unit 1009. When the computer program is loaded on the RAM 1003 and executed by the computing unit 1001, one or more steps of the method 200, method 700 and method 800 described above may be executed. Alternatively, in other embodiments, the computing unit 1001 may be configured to perform the method 200, method 700 and method 800 in any other suitable manner (for example, by means of firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the present disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the present disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, random access memories (RAM), read-only memories (ROM), electrically programmable read-only-memory (EPROM), flash memory, fiber optics, compact disc read-only memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other. The server may be a cloud server, a server of a distributed system, or a server combined with a block-chain.

It should be understood that the various forms of processes shown above can be used to reorder, add or delete steps. For example, the steps described in the present disclosure could be performed in parallel, sequentially, or in a different order, as long as the desired result of the technical solution disclosed in the present disclosure is achieved, which is not limited herein.

The above specific embodiments do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A method for detecting an object in an image, comprising:
    obtaining an image to be detected;
    generating a plurality of feature maps based on the image to be detected by a plurality of feature extracting networks in a neural network model trained for object detection, wherein the plurality of feature extracting networks are connected sequentially, and input data of a latter feature extracting network in the plurality of feature extracting networks is based on output data and input data of a previous feature extracting network; and
    generating an object detection result based on the plurality of feature maps by an object detecting network in the neural network model, wherein the object detecting network comprises a position box detecting branch and an object classifying branch, the position box detecting branch comprises a first depthwise separable convolutional layer, a global average pooling layer and a second depthwise separable convolutional layer, and the object classifying branch comprises a third depthwise separable convolutional layer, a fourth depthwise separable convolutional layer and a fifth depthwise separable convolutional layer, there is a skip connection between the fifth depthwise separable convolutional layer and the third depthwise separable convolutional layer, and input data of the fifth depthwise separable convolutional layer is based on input data and output data of the third depthwise separable convolutional layer.

2. The method of claim 1, wherein generating the plurality of feature maps comprises:
    generating a first feature map by a first feature extracting network based on the image to be detected; and
    generating a second feature map by a second feature extracting network based on the image to be detected and the first feature map.

3. The method of claim 1, wherein generating the plurality of feature maps comprises:
    generating a feature extraction result by a first feature extracting network based on the image to be detected;
    generating a first feature map by a second feature extracting network based on the image to be detected and the feature extraction result; and
    generating a second feature map by a third feature extracting network based on the image to be detected, the feature extraction result and the first feature map.

4. The method of claim 1, wherein generating the plurality of feature maps comprises:
    generating a residual convolution result by a residual convolutional network based on the image to be detected; and
    generating the plurality of feature maps by the plurality of feature extracting networks based on the residual convolution result.

5. The method of claim 4, wherein generating the residual convolution result comprises:
    generating a first branch convolution result, by a first branch comprising a 3*3 convolutional layer and a 1*1 convolutional layer, based on the image to be detected;
    generating a second branch convolution result, by a second branch comprising a 1*1 convolutional layer, a 3*3 convolutional layer and a 1*1 convolutional layer, based on the image to be detected; and
    generating the residual convolution result based on the first branch convolution result and the second branch convolution result.

6. The method of claim 1, wherein generating the object detection result comprises:
    generating a fused feature map by a feature pyramid network in the neural network model based on the plurality of feature maps; and
    generating the object detection result by the object detecting network based on the fused feature map.

7. The method of claim 6, wherein generating the object detection result comprises:
    generating a first convolution result by the first depthwise separable convolutional layer based on the fused feature map;
    generating a pooling result by the global average pooling layer based on the first convolution result; and
    generating position box information of a detected object in the image to be detected, by the second depthwise separable convolutional layer, based on the pooling result.

8. The method of claim 7, wherein a size of a convolution kernel of the first depthwise separable convolutional layer and a size of a convolution kernel of the second depthwise separable convolutional layer are configured to be 5*5.

9. The method of claim 6, wherein generating the object detection result comprises:
    generating a second convolution result by the third depthwise separable convolutional layer based on the fused feature map;
    generating a third convolution result by the fourth depthwise separable convolutional layer based on the second convolution result; and
    generating type information of a detected object in the image to be detected by the fifth depthwise separable convolutional layer based on the second convolution result and the third convolution result.

10. The method of claim 1, wherein the neural network model is generated through multiple rounds of training by an exponential moving average algorithm, and parameters of the exponential moving average algorithm are reset every preset number of training rounds.

11. The method of claim 1, wherein the neural network model is generated through multiple rounds of training, and cosine decay is performed on a learning rate of a round of training in the multiple rounds of training based on a learning rate of a previous round of training.

12. The method of claim 1, wherein the neural network model is generated by training with a gradient descent with momentum algorithm, and a regularization decay rate of the gradient descent with momentum algorithm is configured to be 4e-5.

13. An electronic device, comprising:
    at least one processor; and
    a memory communicatively coupled to the at least one processor;

wherein, the memory stores instructions executable by the at least one processor, when the instructions are executed by the at least one processor, the at least one processor is configured to:

obtain an image to be detected;

generate a plurality of feature maps based on the image to be detected by a plurality of feature extracting networks in a neural network model trained for object detection, wherein the plurality of feature extracting networks are connected sequentially, and input data of a latter feature extracting network in the plurality of feature extracting networks is based on output data and input data of a previous feature extracting network; and generate an object detection result based on the plurality of feature maps by an object detecting network in the neural network model, wherein the object detecting network comprises a position box detecting branch and an object classifying branch, the position box detecting branch comprises a first depthwise separable convolutional layer, a global average pooling layer and a second depthwise separable convolutional layer, and the object classifying branch comprises a third depthwise separable convolutional layer, a fourth depthwise separable convolutional layer and a fifth depthwise separable convolutional layer, there is a skip connection between the fifth depthwise separable convolutional layer and the third depthwise separable convolutional layer, and input data of the fifth depthwise separable convolutional layer is based on input data and output data of the third depthwise separable convolutional layer.

14. The device of claim 13, wherein the at least one processor is further configured to:

generate a first feature map by a first feature extracting network based on the image to be detected; and generate a second feature map by a second feature extracting network based on the image to be detected and the first feature map.

15. The device of claim 13, wherein the at least one processor is further configured to:

generate a feature extraction result by a first feature extracting network based on the image to be detected;

generate a first feature map by a second feature extracting network based on the image to be detected and the feature extraction result; and generate a second feature map by a third feature extracting network based on the image to be detected, the feature extraction result and the first feature map.

16. The device of claim 13, wherein the at least one processor is further configured to:

generate a residual convolution result by a residual convolutional network based on the image to be detected; and generate the plurality of feature maps by the plurality of feature extracting networks based on the residual convolution result.

17. The device of claim 16, wherein the at least one processor is further configured to:

generate a first branch convolution result, by a first branch comprising a 3*3 convolutional layer and a 1*1 convolutional layer, based on the image to be detected;

generate a second branch convolution result, by a second branch comprising a 1*1 convolutional layer, a 3*3 convolutional layer and a 1*1 convolutional layer, based on the image to be detected; and generate the residual convolution result based on the first branch convolution result and the second branch convolution result.

18. The device of claim 13, wherein the at least one processor is further configured to:

generate a fused feature map by a feature pyramid network in the neural network model based on the plurality of feature maps; and generate the object detection result by the object detecting network based on the fused feature map.

19. The device of claim 18, wherein the at least one processor is further configured to:

generate a first convolution result by the first depthwise separable convolutional layer based on the fused feature map;

generate a pooling result by the global average pooling layer based on the first convolution result; and generate position box information of a detected object in the image to be detected, by the second depthwise separable convolutional layer, based on the pooling result, and the at least one processor is further configured to:

generate a second convolution result by the third depthwise separable convolutional layer based on the fused feature map;

generate a third convolution result by the fourth depthwise separable convolutional layer based on the second convolution result; and generate type information of a detected object in the image to be detected by the fifth depthwise separable convolutional layer based on the second convolution result and the third convolution result.

20. A non-transitory computer-readable storage medium having computer instructions stored thereon, wherein the computer instructions are configured to cause a computer to implement a method for detecting an object in an image, comprising:

obtaining an image to be detected;

generating a plurality of feature maps based on the image to be detected by a plurality of feature extracting networks in a neural network model trained for object detection, wherein the plurality of feature extracting networks are connected sequentially, and input data of a latter feature extracting network in the plurality of feature extracting networks is based on output data and input data of a previous feature extracting network; and generating an object detection result based on the plurality of feature maps by an object detecting network in the neural network model, wherein the object detecting network comprises a position box detecting branch and an object classifying branch, the position box detecting branch comprises a first depthwise separable convolutional layer, a global average pooling layer and a second depthwise separable convolutional layer, and the object classifying branch comprises a third depthwise separable convolutional layer, a fourth depthwise separable convolutional layer and a fifth depthwise separable convolutional layer, there is a skip connection between the fifth depthwise separable convolutional layer and the third depthwise separable convolutional layer, and input data of the fifth depthwise separable convolutional layer is based on input data and output data of the third depthwise separable convolutional layer.

* * * * *